(12) United States Patent
Badiru

(10) Patent No.: US 10,661,829 B2
(45) Date of Patent: May 26, 2020

(54) PERFORMANCE ACTIVE AND ADAPTIVE STEERING RESPONSE AND FEEL IN REAL-TIME FOR STEER-BY-WIRE VEHICLE

(71) Applicant: GM Global Technology Operations LLC, Detroit, MI (US)

(72) Inventor: Ibrahim A. Badiru, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 216 days.

(21) Appl. No.: 16/003,583

(22) Filed: Jun. 8, 2018

(65) Prior Publication Data

US 2019/0375451 A1 Dec. 12, 2019

(51) Int. Cl.
*B62D 6/00* (2006.01)
*B62D 15/02* (2006.01)

(52) U.S. Cl.
CPC ........... *B62D 6/002* (2013.01); *B62D 15/021* (2013.01)

(58) Field of Classification Search
CPC .............................. B62D 6/002; B62D 15/021
See application file for complete search history.

(56) References Cited

U.S. PATENT DOCUMENTS

| | | | | |
|---|---|---|---|---|
| 6,098,296 A | * | 8/2000 | Perisho, Jr. ............ | G01B 21/26 33/203 |
| 6,176,341 B1 | * | 1/2001 | Ansari .................... | B62D 5/001 180/402 |
| 9,132,839 B1 | * | 9/2015 | Tan ........................ | B60W 50/00 |
| 9,359,057 B1 | * | 6/2016 | Andrasko .............. | B63H 20/12 |
| 2001/0011201 A1 | * | 8/2001 | Nishizaki ............... | B62D 5/006 701/41 |
| 2002/0035424 A1 | * | 3/2002 | Kaufmann ............. | B62D 5/001 701/41 |
| 2002/0107621 A1 | * | 8/2002 | Byers ..................... | B62D 6/002 701/41 |
| 2003/0169003 A1 | * | 9/2003 | Cao ........................ | B62D 5/092 318/432 |
| 2004/0267424 A1 | * | 12/2004 | Yao ........................ | B62D 5/003 701/43 |
| 2006/0190151 A1 | * | 8/2006 | Tsutsumi ............... | B62D 5/003 701/41 |
| 2009/0248248 A1 | * | 10/2009 | Akuta .................... | B62D 6/002 701/41 |

(Continued)

FOREIGN PATENT DOCUMENTS

WO   WO2018233846 A1 * 12/2018 ............. B62D 15/02

*Primary Examiner* — Calvin Cheung

(57) ABSTRACT

A method for optimizing vehicle steer-by-wire characteristics, includes collecting steer-by-wire steering system data for multiple predetermined data segments. Multiple driving quality objective indices are determined for each segment. A trend line is prepared based on the multiple predetermined data segments using a first algorithm, a second algorithm and a third algorithm, each assigned to one of the driving quality objective indices. Values obtained from the first algorithm, the second algorithm and the third algorithm are superimposed to create a net desired incremental change in damping, steering ratio and base assist. A steering calibration modification command is generated in real-time using the incremental change in damping, steering ratio and base assist.

20 Claims, 5 Drawing Sheets

(56) References Cited

U.S. PATENT DOCUMENTS

| | | | |
|---|---|---|---|
| 2013/0197757 A1* | 8/2013 | Ellis | B62D 6/007 |
| | | | 701/41 |
| 2015/0259007 A1* | 9/2015 | Di Cairano | B62D 6/003 |
| | | | 701/41 |
| 2017/0021859 A1* | 1/2017 | Kodera | B62D 5/0469 |
| 2017/0320516 A1* | 11/2017 | Kashi | B62D 5/0466 |
| 2018/0201298 A1* | 7/2018 | Yamano | B62D 6/008 |
| 2018/0208235 A1* | 7/2018 | Miyashita | B62D 5/001 |
| 2018/0308296 A1* | 10/2018 | Dan | G06F 30/20 |
| 2019/0286127 A1* | 9/2019 | Watanabe | G05D 1/0088 |
| 2019/0389504 A1* | 12/2019 | Itoh | B62D 5/0481 |

\* cited by examiner

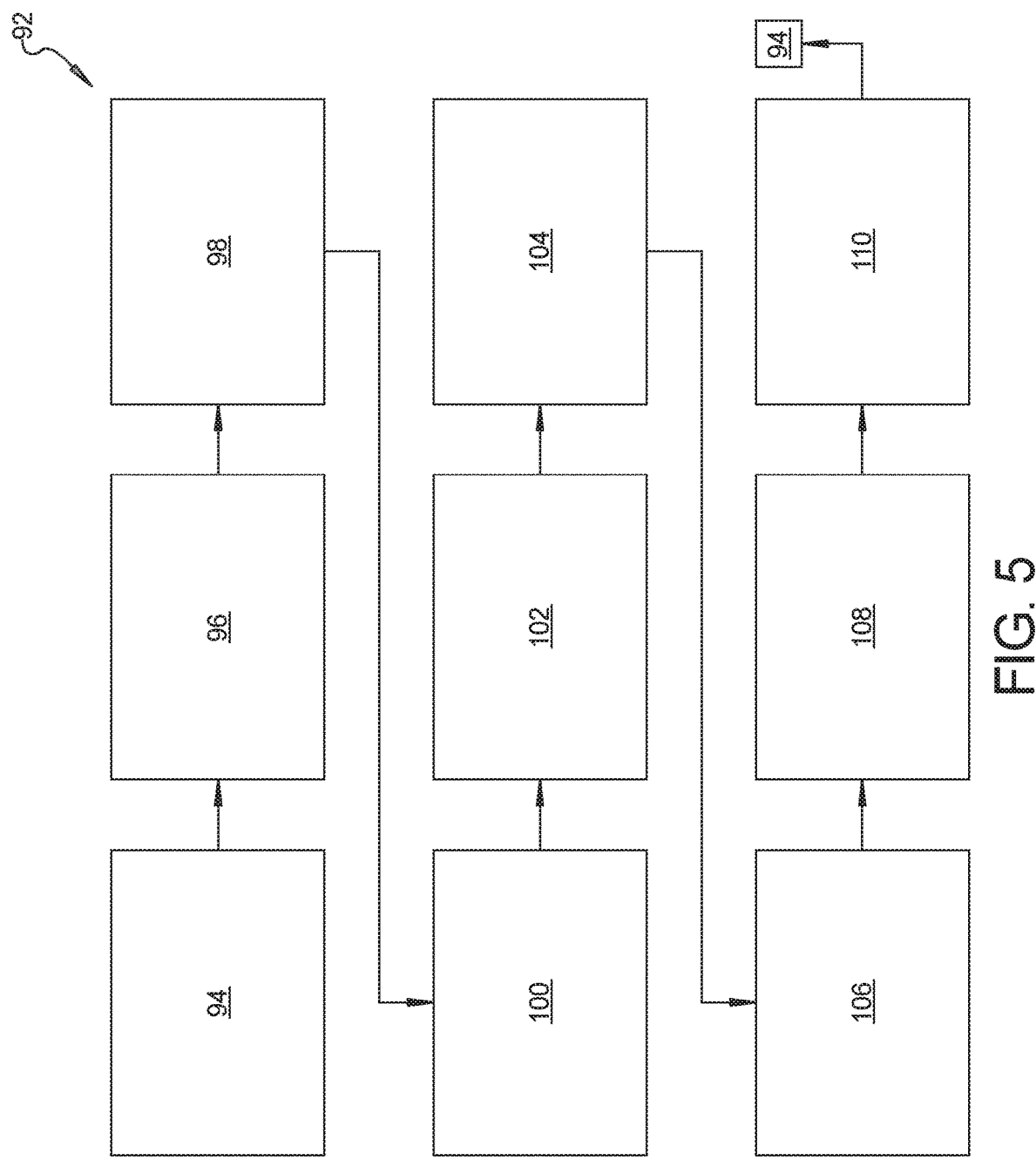

PERFORMANCE ACTIVE AND ADAPTIVE STEERING RESPONSE AND FEEL IN REAL-TIME FOR STEER-BY-WIRE VEHICLE

INTRODUCTION

The present disclosure relates to automobile vehicle steering systems and particularly to vehicles having steer-by-wire systems.

As automobile vehicles age and wear occurs to items such as the tires, suspension, damping components and bushings, the vehicle driving response characteristics change and often degrade. Vehicle response (lateral acceleration) is normally related to a steering wheel angle and a vehicle speed. When vehicle response degrades, the vehicle operator must make more frequent and more pronounced adjustments to a steering wheel position to maintain a desired driving path.

The optimal vehicle steering feel and response characteristics also change with road conditions, driver subjective preference, and vehicle dynamics characteristics. There are currently no known vehicles having the capability to optimize steering attributes in real-time. The current best alternative is to allow the vehicle operator to select between several original equipment manufacturer pre-settings such as sport or performance mode, comfort mode and the like.

Thus, while current automobile vehicle steering systems achieve their intended purpose, there is a need for a new and improved system and method for providing performance active and adaptive steering response in real-time for a steer-by-wire vehicle.

SUMMARY

According to several aspects, a method for optimizing vehicle steer-by-wire characteristics comprises: collecting steer-by-wire steering system data for multiple predetermined data segments; determining multiple driving quality objective indices; creating a net desired incremental change in damping, steering ratio and base assist; and generating a real-time steering calibration modification command.

In another aspect of the present disclosure, the method further includes preparing multiple trend lines based on the multiple predetermined data segments using a first algorithm, a second algorithm and a third algorithm, each assigned to one of the driving quality objective indices.

In another aspect of the present disclosure, the method further includes superimposing values obtained from the first algorithm, the second algorithm and the third algorithm during the creating step.

In another aspect of the present disclosure, each of the data segments define a ten second period of vehicle operation time.

In another aspect of the present disclosure, the method further includes grouping the predetermined data segments into groups of ten data segments.

In another aspect of the present disclosure, the method further includes following the generating step, a first entered segment data is deleted and the collecting step is repeated incorporating a new ten second interval of data.

In another aspect of the present disclosure, the collecting step further includes accumulating the data for the multiple predetermined data segments up to approximately one hundred seconds.

In another aspect of the present disclosure, the method further includes: returning to the collecting step after the generating step; and collecting data for a next data segment.

In another aspect of the present disclosure, the method further includes: deleting the data for a first collected one of the data segments; and repeating each of the determining, creating, and generating steps incorporating the data for the next data segment.

In another aspect of the present disclosure, the method further includes: continuously collecting data on a steering wheel angle and a vehicle yaw rate; and feeding the steering wheel angle and the vehicle yaw rate into a calculator which calculates the driving quality objective indices including a first driving quality objective index defining a steering wheel velocity (SWV) variation index, a second driving quality objective index defining a steering wheel angle (SWA) variation index, and a third driving quality objective index based on calculating a cross correlation (Rxy) index.

According to several aspects, a method for optimizing vehicle steer-by-wire characteristics comprises: collecting steer-by-wire steering system data for multiple predetermined data segments; determining multiple driving quality objective indices; preparing a trend line based on the multiple predetermined data segments using a first algorithm, a second algorithm and a third algorithm, each assigned to one of the driving quality objective indices; superimposing values obtained from the first algorithm, the second algorithm and the third algorithm to create a net desired incremental change in damping, steering ratio and base assist; and generating a real-time steering calibration modification command.

In another aspect of the present disclosure, the method further includes filtering data collected from a predetermined quantity of the predetermined data segments to eliminate segments that exhibit any of the following: excessive mean yaw, excessive mean steering wheel angle or excessive speed variation.

In another aspect of the present disclosure, the trend line is prepared based on a last ten data segments of the multiple predetermined data segments, each based on ten second data periods. The number of data segments or data periods may be variable by the practitioner.

In another aspect of the present disclosure, the method further includes executing the steering calibration modification command via calibration changes to the steer-by-wire calibration tables in communication with a steering unit.

In another aspect of the present disclosure, the method further includes calculating a cross correlation (Rxy) index using vehicle yaw rate and a steering wheel angle data prior to the determining step.

In another aspect of the present disclosure, the multiple driving quality objective indices include: a first driving quality objective index defining a steering wheel velocity (SWV) variation index; a second driving quality objective index defining a steering wheel angle (SWA) variation index; and a third driving quality objective index based on calculating the cross correlation (Rxy) index.

In another aspect of the present disclosure, the method further includes: returning to the collecting step after the generating step; collecting data for a next data segment deleting the data for a first collected one of the data segments; and repeating each of the determining, preparing, superimposing, and generating steps incorporating the data for the next data segment.

According to several aspects, a method for optimizing vehicle steer-by-wire characteristics comprises: continuously collecting data on a steering wheel angle and a vehicle yaw rate; feeding the steering wheel angle and the vehicle yaw rate into a calculator which calculates a set of driving quality objective indices defining a first driving quality objective index defining a steering wheel velocity (SWV) variation index, a second driving quality objective index defining a steering wheel angle (SWA) variation index, and a third driving quality objective index based on calculating a cross correlation (Rxy) index; forwarding each of the first, second and third driving quality objective indices to a math optimization routine wherein a first algorithm defining a damping increment function is applied based on the first driving quality objective index, a second algorithm defining a base assist increment function is applied based on the second driving quality objective index, and a third algorithm defining a steer ratio increment function is applied based on the third driving quality objective index; and forwarding an output from each of the algorithms of the math optimization routine to a change command unit wherein in real-time the output from the first algorithm is implemented as an incremental damping change command, the output from the second algorithm is implemented as an incremental base assist change command, and the output from the third algorithm is implemented as an incremental steer-by-wire effective steer ratio command.

In another aspect of the present disclosure, the method further includes individually forwarding each of the incremental change commands from the change command unit to a steering feel logic control unit wherein any one, any two or all of the incremental change commands that are received are superimposed to produce a steering calibration modification command acting on a steering unit.

In another aspect of the present disclosure, the method further includes following production of the steering calibration modification command, a steering character monitor continuously monitors and records vehicle behavior to determine if further adjustment is required, and returns to the calculator if necessary for further steering adjustment commands.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 5 is a block diagram summarizing the steps for performing the method of FIG. 3.

DETAILED DESCRIPTION

The following description is merely exemplary in nature and is not intended to limit the present disclosure, application, or uses.

Figure 1:
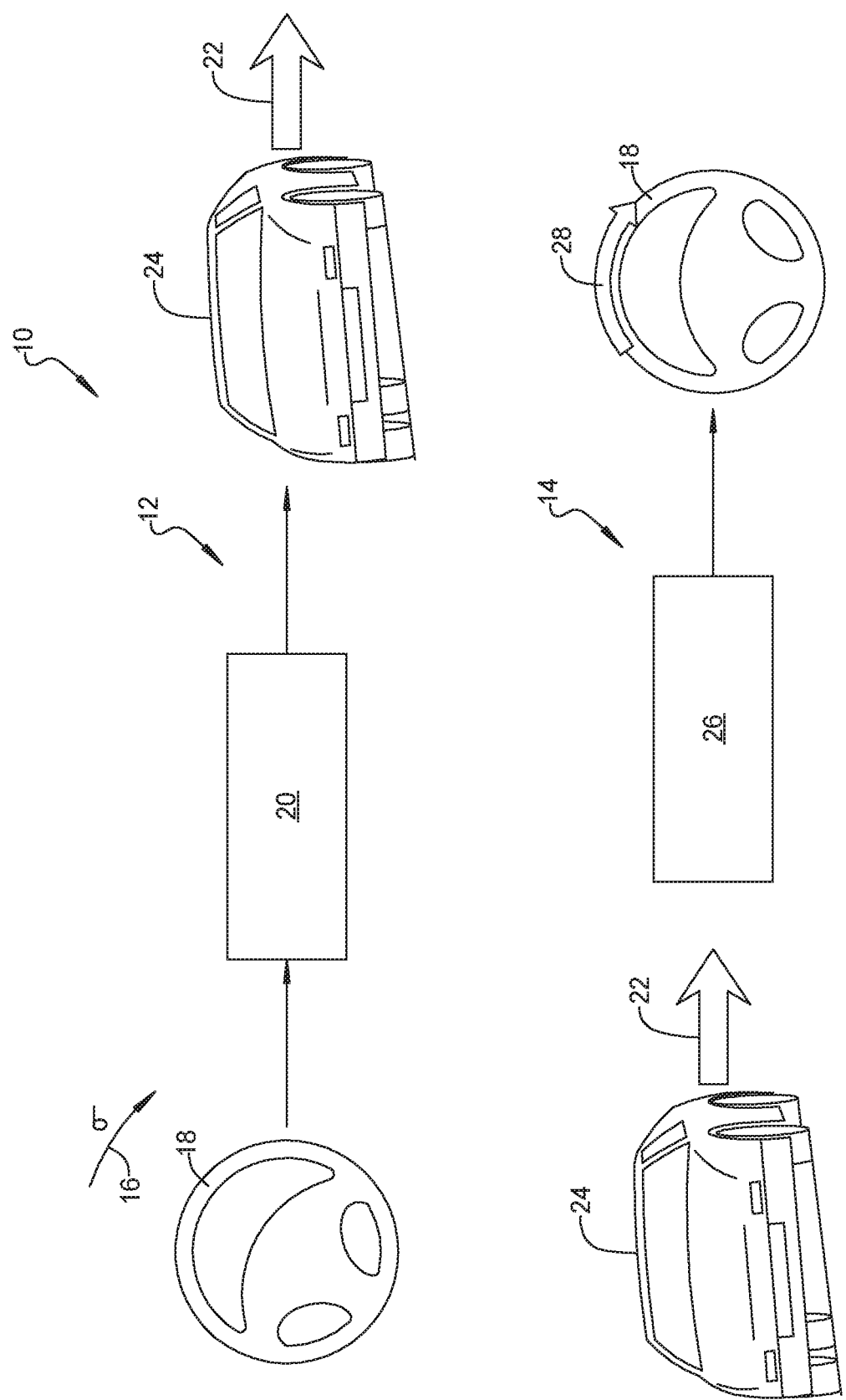
FIG. 1 is a diagram of steering response and steering feel inputs and outputs according to an exemplary embodiment.

Referring to FIG. 1, a method for optimizing vehicle steer-by-wire characteristics 10 provides for optimizing a steering response portion 12 and a steering feel portion 14. The steering response portion 12 incorporates a steering angle 16 of a vehicle steering wheel 18 using a vehicle control unit 20 to induce a lateral acceleration 22 for an automobile vehicle 24. The steering feel portion 14 applies the lateral acceleration 22 of the vehicle 24 in a steer-by-wire control system 26 of the vehicle 24 to generate a driver feedback steering torque 28 in the steering wheel 18. The method for optimizing vehicle steer-by-wire characteristics 10 automatically optimizes steering feel and response characteristics in vehicles using real-time steering calibration modifications. Optimization is based on a set of real-time calculated objective metrics that characterize the quality of man-machine driving performance. These metrics are fed into an optimization routine that adjusts steer-by-wire system settings which improve the "man-machine performance score" and thereby optimize the steering experience for a vehicle operator in a current driving scenario.

Figure 2:
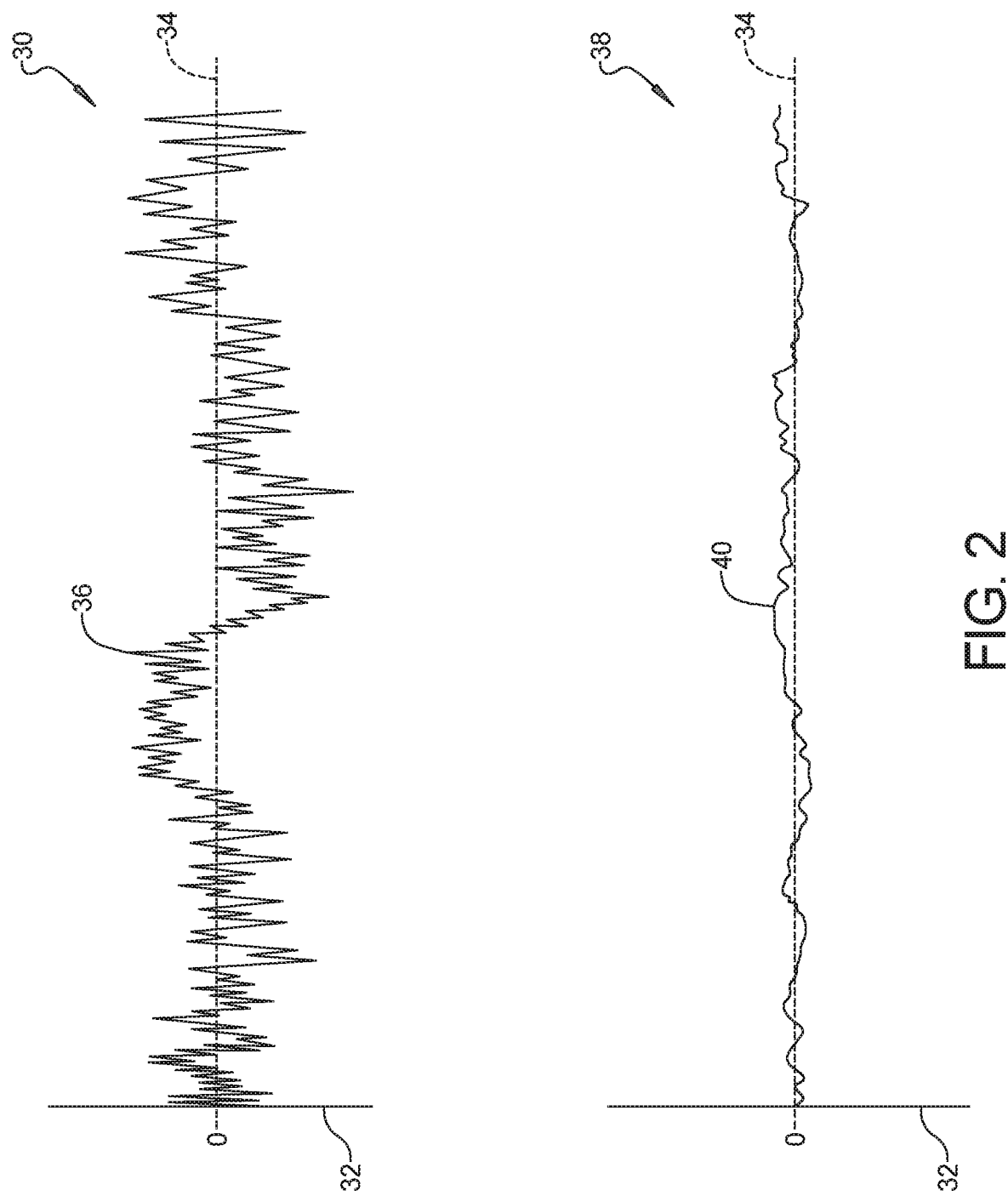
FIG. 2 is a pair of graphs comparing non-optimized vehicle steering position behavior to vehicle steering behavior with an optimized steering calibration curve.

Referring to FIG. 2 and again to FIG. 1, a first graph portion 30 provides a steering angle 32 over a time period 34 presenting a non-optimized steering curve 36. A second graph portion 38 provides an optimized steering behavior 40 for the steering angle 32 over the same time period 34. Application of the method for optimizing vehicle steer-by-wire characteristics 10 of the present disclosure reduces the quantity and amplitude of driver steering angle modifications required to maintain a steady travel vehicle path.

A typical steering gear has the following calibratable parameters to influence the steering feel: 1. damping; 2. base assist; 3. inertia; 4. friction compensation; and 5. steering wheel active return. In a steer-by-wire vehicle there is an additional tunable parameter to adjust steering response defined as: 6. effective steer ratio, which is defined as a steering wheel angle compared to a road-wheel angle, which are based on steering speed and steering angle. Vehicle steering feel and response characteristics are important considerations for human driving task performance and ease of driving. Each individual operator has a different optimized set of steering characteristics (response and feel) based on the driver's subjective preference, road conditions, and the vehicle state. By incorporation of real-time data measurement plus objective calculations a quality of the vehicle performance for a current steering task can be quantified. The quality of the vehicle performance is also a measure or profile of how well the vehicle is responding to the driver inputs.

The real-time data measurement includes measurement of a steering wheel angle, a steering wheel torque, and a vehicle lateral acceleration as discussed above in reference to FIG. 1 indicated by a yaw rate of the vehicle. With reference again to FIG. 2, the multiple perturbations in the non-optimized steering curve 36 are interpreted to indicate the steering system is not meeting the driver's expectations. With the real-time measurements of system performance, the method for optimizing vehicle steer-by-wire characteristics 10 of the present disclosure automatically optimizes the steering characteristics to produce the smoother optimized steering curve 40.

Figure 3:
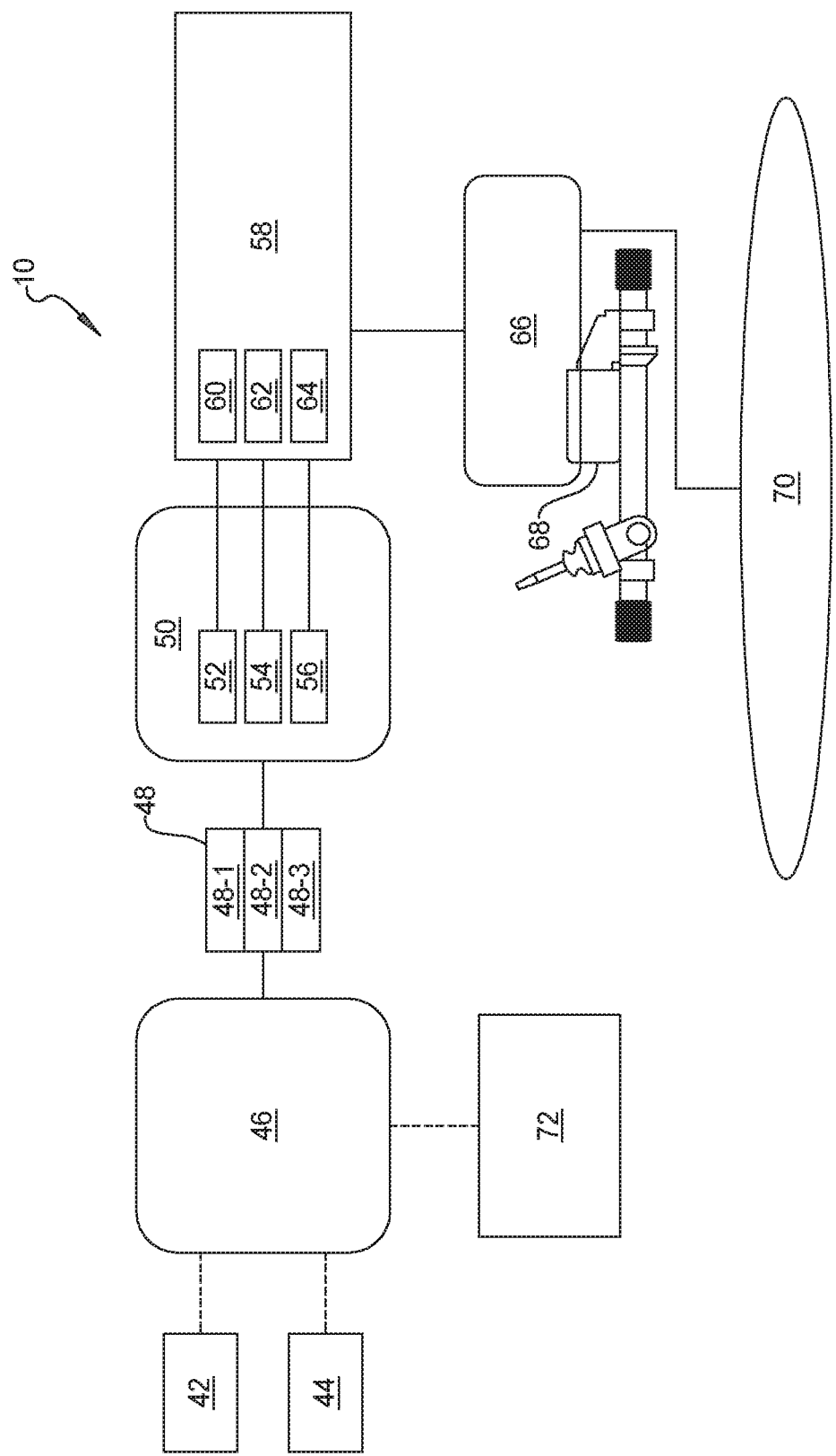
FIG. 3 is a flow diagram of the method for optimizing vehicle steer-by-wire characteristics of the present disclosure.

Referring to FIG. 3, the method for optimizing vehicle steer-by-wire characteristics 10 continuously collects data on a steering wheel angle 42 and a vehicle yaw rate (vehicle lateral acceleration) 44 from sensors (not shown) which are well known. The steering wheel angle 42 and the vehicle yaw rate 44 are both fed into a calculator 46 which calculates a set of driving quality objective indices 48 defining a first driving quality objective index 48-1 defining a steering wheel velocity (SWV) variation index, a second driving quality objective index 48-2 defining a steering wheel angle (SWA) variation index, and a third driving quality objective index 48-3 based on the cross correlation (Rxy) index. Each of the three driving quality objective indices 48 are then forwarded to a math optimization routine 50. In the math optimization routine 50, a first algorithm 52 defining a damping increment function is applied based on the first driving quality objective index 48-1, a second algorithm 54 defining a base assist increment function is applied based on the second driving quality objective index 48-2, and a third algorithm 56 defining a steer ratio increment function is applied based on the third driving quality objective index 48-3.

The outputs from the algorithms of the math optimization routine 50 are then forwarded to a change command unit 58. In the change command unit 58, the output from the first algorithm 52 is implemented as an incremental damping change command 60, the output from the second algorithm 54 is implemented as an incremental base assist change command 62, and the output from the third algorithm 56 is implemented as an incremental steer-by-wire effective steer ratio command 64.

The incremental commands from the change command unit 58 are individually forwarded in real-time to a steering feel logic control unit 66 wherein any one, any two or all of the incremental change commands that are received are superimposed (added together) to produce a steering calibration modification command acting on a steering unit 68. The steering unit 68 makes changes in real-time, defined as occurring during a current vehicle operation. Following incorporation of the steering change command, a steering character monitor 70 continuously monitors the steering unit 68 to determine if further adjustment is required, and returns to the calculator 46 if necessary for further steering adjustment commands. The steering character monitor 70 performs vehicle steering character monitoring over fixed time segments, for example in ten second intervals. According to several aspects, a rate of change of each of the indexes is monitored for the previous ten segments to determine a steering trend. At each monitoring segment end, the last entered segment data is deleted and a new ten second interval of data is entered, therefore steering data being evaluated accumulates up to approximately one hundred seconds. It is noted that the ten second interval of each segment, and the selection of ten segments for cumulative monitoring are provided as examples, as the intervals can be more or less than ten seconds, and the quantity of ten segments can be varied at the manufacturer's discretion.

According to several aspects, the first driving quality objective index 48-1 defining the steering wheel velocity (SWV) variation index is calculated from [mean steering velocity divided by mean yaw velocity]. The second driving quality objective index 48-2 defining the steering wheel angle (SWA) variation index is calculated from [a standard deviation of a steering wheel angle $\sigma_{swa}$ divided by the mean yaw velocity]. The third driving quality objective index 48-3 defining the cross correlation (Rxy) index is calculated using the following equation:

$$\text{index} = \left(\frac{\text{avg\_Rxy\_max}}{\text{avg\_}\sigma_{SWA}}\right) + 6 * \text{avg\_}\sigma_{SWA}$$

where:

Rxy=cross-correlation index between steering angle and yaw rate defining how close to a 1:1 relation a steering input is to a vehicle response;

avg_$\sigma_{swa}$=a standard deviation of steering wheel angle; and

6*avg_$\sigma_{swa}$ provides a curve best-fit for steering data measurements.

Figure 4:
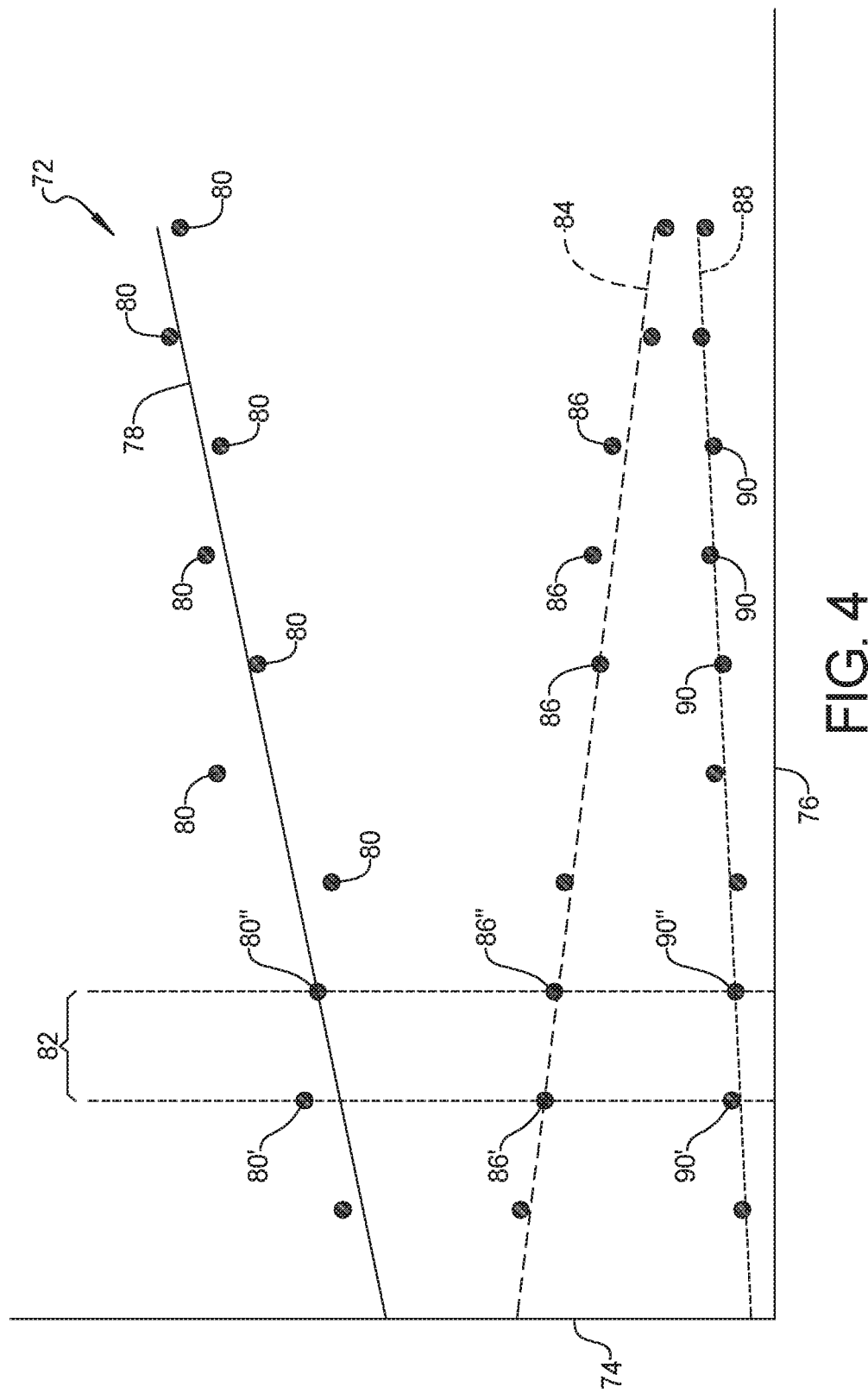
FIG. 4 is a graph presenting trend lines produced using the method of FIG. 3.

Referring to FIG. 4, a graph 72 presents a quality index 74 and multiple trend segments 76 for an exemplary ten segment section of data collected for the method for optimizing vehicle steer-by-wire characteristics 10. In this example, a trend line for an SWV variation index curve 78 is defined by ten segment data points 80 defining multiple predetermined data segments using a best fit approximation. A single segment 82 between exemplary points 80', 80" represents data collected for a ten second interval of vehicle operation. The trend line or SWV variation index curve 78 has an upward slope, indicating a positive trending quality index over the ten segment window shown. A second trend line or Rxy index curve 84 is defined by ten segment data points 86 using a best fit approximation. The same single segment 82 between exemplary points 86', 86" represents data collected for the same ten second interval of vehicle operation as the SWV variation index curve 78. The Rxy index curve 84 has a downward slope, indicating a negative trending quality index over the ten segment window shown. A third trend line or SWA variation index curve 88 is defined by ten segment data points 90 using a best fit approximation. The same single segment 82 between exemplary points 90', 90" represents data collected for the same ten second interval of vehicle operation as the SWV variation index curve 78. The trend line or SWA variation index curve 88 has an upward slope, indicating a positive trending quality index over the ten segment window shown, with a lower increasing rate than the SWV variation index curve 78.

With continuing reference to FIGS. 3 and 4, the data presented by the multiple trend lines in FIG. 4 can be applied using the math optimization routine 50. For example, the output from the first algorithm 52 indicates a 10 point higher damping incremental change is required, the output from the second algorithm 54 indicates a 2 point higher base assist incremental change is required, and the output from the third algorithm 56 indicates a 5 point lower steer ratio incremental change is required. The steering feel logic control unit 66 superimposes (adds) these values which combined indicate a trend or net 7 point higher incremental change should be ordered for the steering unit 68.

Referring to FIG. 5 and again to FIGS. 1 through 4, a flow diagram 92 provides steps taken by the method for optimizing vehicle steer-by-wire characteristics 10. In a first step 94 data is collected for a predetermined period of time, for example a ten second data segment. In a second step 96 the data collected from a predetermined quantity of data segments, for example ten previous sequential data segments, is filtered to eliminate data presenting excessive mean yaw, excessive mean steering wheel angle and/or excessive speed variation. In a third step 98 the cross correlation (Rxy) index is calculated from the vehicle yaw rate data and the steering wheel angle data. In a fourth step 100, the driving quality objective indices 48 are calculated. In a fifth step 102, the calculated driving quality objective indices 48 as well as data collected above are stored to a data table. In a sixth step 104, data for a predetermined quantity, for example the last ten segments of data is retrieved from the data table and a trend line is calculated similar to the multiple trend lines discussed in reference to FIG. 4, based on the last ten segments of ten second data periods using the first algorithm 52, the second algorithm 54 and the third algorithm 56, each assigned to one of the driving quality objective indices 48.

In a seventh step 106, a net desired incremental change in damping, steering ratio and base assist is calculated by superimposing (adding) the values obtained from the first algorithm 52, the second algorithm 54 and the third algorithm 56. In an eighth step 108, a steering calibration modification command is generated in the steering feel logic control unit 66. In a ninth step 110, the steering calibration modification command is executed via a calibration change steer-by-wire calibration table in communication with the steering unit 68. The program then returns to the first step 94 where data is collected for a next ten second data segment.

A method for optimizing vehicle steer-by-wire characteristics 10 of the present disclosure offers several advantages. These include provision of a real-time objective calculation of vehicle steering performance. Also provided are a real-time adjustment of steer-by-wire steering attributes to optimize steering performance based on a defined optimization function. Application of the method for optimizing vehicle steer-by-wire characteristics 10 of the present disclosure also reduces the quantity and amplitude of driver steering angle modifications required to maintain a steady travel vehicle path.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for optimizing vehicle steer-by-wire characteristics, comprising:
    collecting steer-by-wire steering system data for multiple predetermined data segments;
    determining multiple driving quality objective indices;
    creating a net desired incremental change in damping, steering ratio and base assist; and
    generating a real-time steering calibration modification command.

2. The method of claim 1, further including preparing multiple trend lines based on the multiple predetermined data segments using a first algorithm, a second algorithm and a third algorithm, each assigned to one of the driving quality objective indices.

3. The method of claim 2, further including superimposing values obtained from the first algorithm, the second algorithm and the third algorithm during the creating step.

4. The method of claim 1, wherein each of the data segments define a ten second period of vehicle operation time.

5. The method of claim 1, further including grouping the predetermined data segments into groups of ten data segments.

6. The method of claim 1, wherein following the generating step, a first entered segment data is deleted and the collecting step is repeated incorporating a new ten second interval of data.

7. The method of claim 1, wherein the collecting step further includes accumulating data for the multiple predetermined data segments up to approximately one hundred seconds.

8. The method of claim 1, further including:
    returning to the collecting step after the generating step; and
    collecting data for a next data segment.

9. The method of claim 8, further including:
    deleting the data for a first collected one of the data segments; and
    repeating each of the determining, creating, and generating steps incorporating the data for the next data segment.

10. The method of claim 1, further including:
    continuously collecting data on a steering wheel angle and a vehicle yaw rate; and
    feeding the steering wheel angle and the vehicle yaw rate into a calculator which calculates the driving quality objective indices including a first driving quality objective index defining a steering wheel velocity (SWV) variation index, a second driving quality objective index defining a steering wheel angle (SWA) variation index, and a third driving quality objective index based on calculating a cross correlation (Rxy) index.

11. A method for optimizing vehicle steer-by-wire characteristics, comprising:
    collecting steer-by-wire steering system data for multiple predetermined data segments;
    determining multiple driving quality objective indices;
    preparing a trend line based on the multiple predetermined data segments using a first algorithm, a second algorithm and a third algorithm, each assigned to one of the driving quality objective indices;
    superimposing values obtained from the first algorithm, the second algorithm and the third algorithm to create a net desired incremental change in damping, steering ratio and base assist; and
    generating a real-time steering calibration modification command.

12. The method of claim 11, further including filtering data collected from a predetermined quantity of the predetermined data segments to eliminate segments that exhibit any of the following: excessive mean yaw, excessive mean steering wheel angle or excessive speed variation.

13. The method of claim 11, wherein the trend line is prepared based on a last ten data segments of the multiple predetermined data segments, each based on ten second data periods.

14. The method of claim 11, further including executing the steering calibration modification command via calibration changes to multiple steer-by-wire calibration tables in communication with a steering unit.

15. The method of claim 11, further including calculating a cross correlation (Rxy) index using vehicle yaw rate data and steering wheel angle data prior to the determining step.

16. The method of claim 11, wherein the multiple driving quality objective indices include:
    a first driving quality objective index defining a steering wheel velocity (SWV) variation index;
    a second driving quality objective index defining a steering wheel angle (SWA) variation index; and
    a third driving quality objective index based on calculating a cross correlation (Rxy) index.

17. The method of claim 11, further including:
    returning to the collecting step after the generating step;
    collecting data for a next data segment;
    deleting the data for a first collected one of the data segments; and
    repeating each of the determining, preparing, superimposing, and generating steps incorporating the data for the next data segment.

18. A method for optimizing vehicle steer-by-wire characteristics, comprising:
    continuously collecting data on a steering wheel angle and a vehicle yaw rate;
    feeding the steering wheel angle and the vehicle yaw rate into a calculator which calculates a set of driving quality objective indices defining a first driving quality objective index defining a steering wheel velocity (SWV) variation index, a second driving quality objective index defining a steering wheel angle (SWA) variation index, and a third driving quality objective index based on calculating a cross correlation (Rxy) index;

forwarding each of the first, second and third driving quality objective indices to a math optimization routine wherein a first algorithm defining a damping increment function is applied based on the first driving quality objective index, a second algorithm defining a base assist increment function is applied based on the second driving quality objective index, and a third algorithm defining a steer ratio increment function is applied based on the third driving quality objective index; and forwarding an output from each of the algorithms of the math optimization routine to a change command unit wherein in real-time the output from the first algorithm is implemented as an incremental damping change command, the output from the second algorithm is implemented as an incremental base assist change command, and the output from the third algorithm is implemented as an incremental steer-by-wire effective steer ratio command.

19. The method of claim 18, further including individually forwarding each of the incremental change commands from the change command unit to a steering feel logic control unit wherein any one, any two or all of the incremental change commands that are received are superimposed to produce a steering calibration modification command acting on a steering unit.

20. The method of claim 19, further including following production of the steering calibration modification command, a steering character monitor continuously monitors and records vehicle behavior to determine if further adjustment is required, and returns to the calculator if necessary for further steering adjustment commands.

* * * * *